United States Patent Office 3,138,022
Patented June 23, 1964

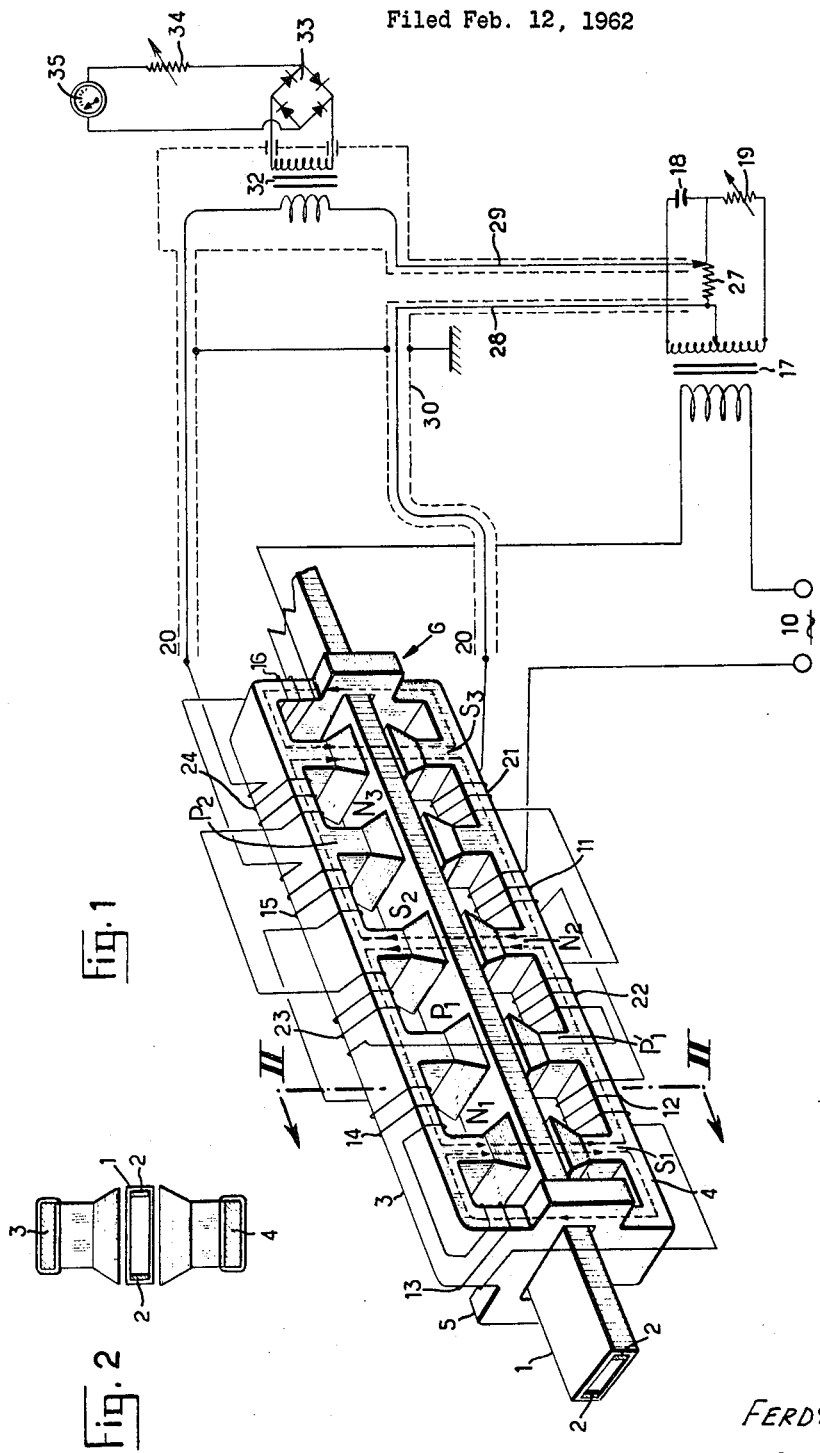

3,138,022
INDUCTION CONTROLLED FLOWMETERS FOR CONDUCTIVE LIQUIDS
Ferdy Mayer, 4 Ave. de Beauvert, Grenoble, France
Filed Feb. 12, 1962, Ser. No. 172,651
Claims priority, application France Feb. 14, 1961
1 Claim. (Cl. 73—194)

My invention has for its object induction controlled flowmeters for conductive liquids.

Such flowmeters include, in combination with a section of a tubular pipe through which the conductive liquid to be measured flows, a magnetic circuit system associated with windings adapted to produce inside the pipe an alternating magnetic field extending perpendicularly to the direction of the flow inside said pipe and means for collecting and/or detecting an electromotive force or displacement force proportional to said field and to the speed of flow, the direction of which force, arising through induction in the moving liquid, is perpendicular to said field and to said speed.

In order to collect such an electromotive force, it has already been proposed to resort to electrodes arranged transversely inside the wall of the pipe, said wall being in its turn covered inwardly by an insulating coat throughout the area in which the measurements are to be obtained. Now, the arrangement of the electrodes thus insulated with a fluidtight passage through the walls of the pipe leads to problems which cannot be solved readily under high pressures and temperatures.

In order to overcome these difficulties, it has already been proposed to detect the electromotive force or displacement force induced, no longer directly but through the detection of a secondary alternating field which may be termed a displacement field and which is obtained through a deformation, by the displacement, of the field produced by the induced circulating currents to oppose the inducing field; a secondary winding arranged symmetrically with reference to the inducing poles outwardly of the tube may thus become the source of an electromotive force proportional to the speed of flow of the liquid.

Experience has shown that apparatus based on said principle were extremely difficult to handle and the very reduced amplitude of the voltages collected required a very energetic amplification. The measurements were disturbed by an exaggerated noise level and the apparatus were highly sensitive to parasitic magnetic fields.

My invention has for its object a novel flowmeter of the induction type, wherein means arranged on the outside of the pipe in which the liquid flows, produce, on the one hand, an alternating field perpendicular to the direction of flow, while there is collected, on the other hand, a reaction voltage which is proportional to the speed of displacement, said arrangement at least partly eliminating the drawbacks referred to hereinabove, inherent to the apparatus proposed hitherto.

My invention is based on the observation of the possible and surprising improvement of the performances of flowmeters of the type considered, which improvement is obtained through the particular design of its various parts and this design allows an industrial execution which it would be difficult to obtain in the case of the precedingly proposed and tested arrangements.

The novel features and advantages of my invention will appear furthermore from the reading of the following description given by way of example, reference being made to the accompanying drawings, wherein:

FIG. 1 is a diagrammatic illustration of an induction flowmeter according to the invention and of its measuring circuit.

FIG. 2 is a detail transverse cross-sectional view of the magnetic circuit and of the pipe.

In the embodiment selected for illustration, the reference number 1 designates a pipe of a substantially rectangular cross-section through which the liquid throughput to be measured flows, for instance that of a metal liquid having a resistivity of about 100 microhms per centimeter. Said pipe is made of a non-magnetic material having an electric resistivity which is clearly higher than that of the liquid flowing through it. The inner surface of the pipe is lined along the small sides of its cross-section with strips 2 of a highly conductive metal, such as copper, for instance.

The pipe 1 passes throughout a magnetic circuit of a generally elongated rectangular shape including two longitudinal sides or strip-shaped yokes 3 and 4 located to either side of and in parallelism with the broad sides of the pipe and associated with two terminal sides or flanges 5 and 6 which are shaped so as to allow the pipe to pass, for instance, through openings of a suitable size, so as to be fitted over said pipe and serve, if required, as carriers for the latter. Said magnetic circuit constituted by a stack of magnetic metal sheets is provided between its longitudinal sides with a plurality of pairs of inducing poles N1–S1, N2–S2, N3–S3 terminating with pole-pieces expanding in contact with or in the immediate proximity of the broader sides of the pipe 1, said poles being associated with a suitable system of inducing windings illustrated diagrammatically at 11 to 16. Said system of poles and inducing windings is designed in a manner such as to produce inside the pipe an alternating magnetic field, the windings 11 to 16 being fed through a supply 10 of alternating current, the frequency of which is, say 50 cycles.

It is apparent from inspection of FIG. 1, on which flux lines appear as dotted arrow-carrying lines, that there is thus obtained inside the pipe 1 a series of induction areas defined by the pole-pieces of the inducing poles, which areas form the seat of alternating fluxes of opposed directions which are substantially uniform and balanced by reason in particular of the presence of the lateral closing flanges 5 and 6 of the magnetic circuit.

The magnetic circuit includes lastly, in symmetrical relationship with reference to the inducing poles N–S, collecting poles P1–P'1, P2–P'2, each pair of collecting poles extending between successive pairs of inducing poles N–S. Said collecting poles cooperate with a system of collecting windings illustrated diagrammatically at 21 to 24 and which are connected across the terminals 20 of a measuring circuit and arranged symmetrically in a manner such that the voltage collected across said terminals may be zero when the liquid inside the pipe 1 is stationary.

A transformer 17 has its primary winding connected in series with the inducing windings 11 to 16, whereas its secondary winding provided with a medial tapping, feeds a compensating system including a voltage divider with a condenser 18, an adjustable resistance 19 and a potentiometer 27 connected with the medial tapping of the secondary of the transformer 17. This allows compensating the effects of parasitic fields and feeding between the outputs 28 and 29 of said potentiometer, a correcting voltage of a variable amplitude adjusted through a shifting of the slider of the potentiometer 27, while its phase may be adjusted through the variable resistance 19.

The measuring circuit 21–24 connected across the terminals 20 in series with the output 28–29 of the potentiometer of the compensating system, is protected by the shielding 30 and includes the primary winding of a low-loss booster transformer 32, of which the secondary feeds, through the agency of a bridge 33 comprising rectifiers and of a rheostat 34 for the adjustment of amplitude, a galvanometer 35 of the movable frame type forming the actual flow-measuring instrument.

When the liquid in the pipe 1 is stationary, the currents induced inside it remain symmetrical with reference to the collecting poles P and the voltage induced in the collecting windings remains equal to zero. It is sufficient, for this purpose, to act on the compensating means at 27 and at 19 to the extent required for actually returning to zero the voltage which may appear across the terminals 20 under the action of parasitic fields.

When the liquid flows through the pipe and passes through the field produced by the inducing poles, this leads to the production along the lateral surfaces of the liquid stream of an electromotive force proportional to the speed of flow and, consequently, of induced currents which in their turn lead to the formation of an alternating flux between the auxiliary collecting poles P. There is thus collected across the terminals 20 a voltage, the frequency of which is equal to that of the supply 10 (say 50 cycles, for instance), while its amplitude is proportional to the speed of flow and thereby to the throughput of liquid. Said displacement voltage increased by the shielded transformer 32 and rectified at 33, is measured by a d'Arsonval galvanometer 35.

Experience shows that the flowmeter thus designed provides surprising performances as follows:

The level of the signal obtained for a predetermined value of the throughput and of the conductivity of the liquid shows a gain of a magnitude of 40 db with reference to the elementary arrangements proposed and tested hitherto;

The response is linear within a very large range of speeds of displacement;

The system is protected with reference to outer parasitic magnetic fields;

The ratio between signal and noise is increased.

Said performances are ascribable to the elongated structure and multiplicity of poles of the magnetic circuit closed over itself by the terminal flanges 5 and 6 in association with the strips 2 through which the induced current flows. The magnetically continuous circuit formed round the system by the longitudinal yoke sections 3 and 4 is probably responsible for the excellent protection obtained against parasitic fields. An initial adjustment of the compensating means is generally sufficient to prevent any dissymmetric action by supplying a correction which is independent of the heating to which the system may be subjected. The linearity of response is ascribable to the uniformity in structure of the inducing magnetic field produced over a substantial length of the pipe by the succession of inducing poles associated with the closing flanges. The improvement of the ratio between signal and noise is lastly explainable through the uniformization and length of the quadrature field provided by the displacement of the fluid. The amplitude of the signal obtained is such that it is possible, for the applications to be considered nowadays, such as the measurement of the throughput of liquid metal in the cooling circuits of nuclear reactors, to obtain directly measured values without any amplification being required.

My invention is obviously not limited to the embodiment selected and illustrated, which has been given solely by way of example and which may be subjected to various modifications within the scope of the accompanying claim, in particular as concerns the shape of the closing flanges of the magnetic circuit, or the length and number of pairs of inducing and collecting poles.

What I claim is:

A flowmeter of the induction type, for an electrically conductive liquid, comprising an elongated pipe section of a rectangular cross-section through which the electrically conductive liquid flows, and made of a material of a very low electric conductivity, two strips of a highly conductive metal fitted along the inner surfaces of the narrower sides of the rectangular pipe sections, a continuous magnetic circuit adapted to produce in said pipe an alternating magnetic field perpendicular to the direction of flow, said magnetic circuit including two elongated yokes extending along the broader sides of the pipe at a short distance outside same and terminal flanges interconnecting the ends of said yokes transversely of the pipe section, at least two pairs of inducing poles carried by the corresponding yokes and facing at their free ends the cooperating broader sides of the pipe section, a pair of collecting poles arranged between any two successive pairs of inducing poles and facing also the cooperating broad surfaces of the pipe sections, two series of windings inductively associated respectively with the inducing poles and with the collecting poles, a supply of alternating voltage feeding the series of windings associated with the inducing poles, and indicating means fed by the windings associated with the collecting poles.

References Cited in the file of this patent

UNITED STATES PATENTS

| | | |
|---|---|---|
| 2,435,043 | Lehde et al. | Jan. 27, 1948 |
| 2,583,724 | Broding | Jan. 29, 1952 |
| 2,733,604 | Coulter | Feb. 7, 1956 |

FOREIGN PATENTS

| | | |
|---|---|---|
| 1,157,500 | France | Dec. 30, 1957 |